United States Patent [19]

Van Der Steeg

[11] Patent Number: 4,844,165
[45] Date of Patent: Jul. 4, 1989

[54] TFL ASSEMBLY FOR A DUAL DIAMETER FLOW-LINE/RISER SYSTEM AND FLOW-LINE/RISER SYSTEM FOR USE WITH THE ASSEMBLY

[75] Inventor: Jan Van Der Steeg, Amsterdam, Netherlands

[73] Assignee: Shell Oil Company, Houston, Tex.

[21] Appl. No.: 152,614

[22] Filed: Feb. 5, 1988

[30] Foreign Application Priority Data

Feb. 5, 1987 [GB] United Kingdom ................. 8702547

[51] Int. Cl.$^4$ ...................... E21B 23/10; E21B 37/04; B08B 9/04
[52] U.S. Cl. ..................................... 166/367; 166/170; 166/177; 166/153; 166/156; 15/104.061
[58] Field of Search ............... 166/347, 350, 359, 367, 166/153, 70, 170, 155, 177, 154; 15/104.061, 104.05, 104.062; 137/242, 244; 138/108; 406/49, 50, 191, 195

[56] References Cited

U.S. PATENT DOCUMENTS

| | | | |
|---|---|---|---|
| 2,382,578 | 8/1945 | Penick | 166/155 |
| 3,020,964 | 2/1962 | Graham et al. | 15/104.061 X |
| 3,616,850 | 11/1971 | Scott | 166/155 |
| 3,751,932 | 8/1973 | Matthews, Jr. | 15/104.061 X |
| 3,961,493 | 6/1976 | Nolan, Jr. et al. | 15/104.062 X |
| 4,407,364 | 10/1983 | Johnston | 166/155 X |
| 4,624,312 | 11/1986 | McMullin | 166/155 |

*Primary Examiner*—Bruce M. Kisliuk

[57] ABSTRACT

A TFL assembly is disclosed for use in a dual diameter flow-line/riser system which includes a small diameter flow-line section and a large diameter riser section. The assembly comprises a pig fitting in the small diameter flow-line section and a pig catching tool fitting in the large diameter riser section. The pig catching tool comprises a central opening which is sealed off by the pig upon joining said pig and tool after entry of the pig from the small diameter flow-line section into the large diameter riser section.

12 Claims, 1 Drawing Sheet

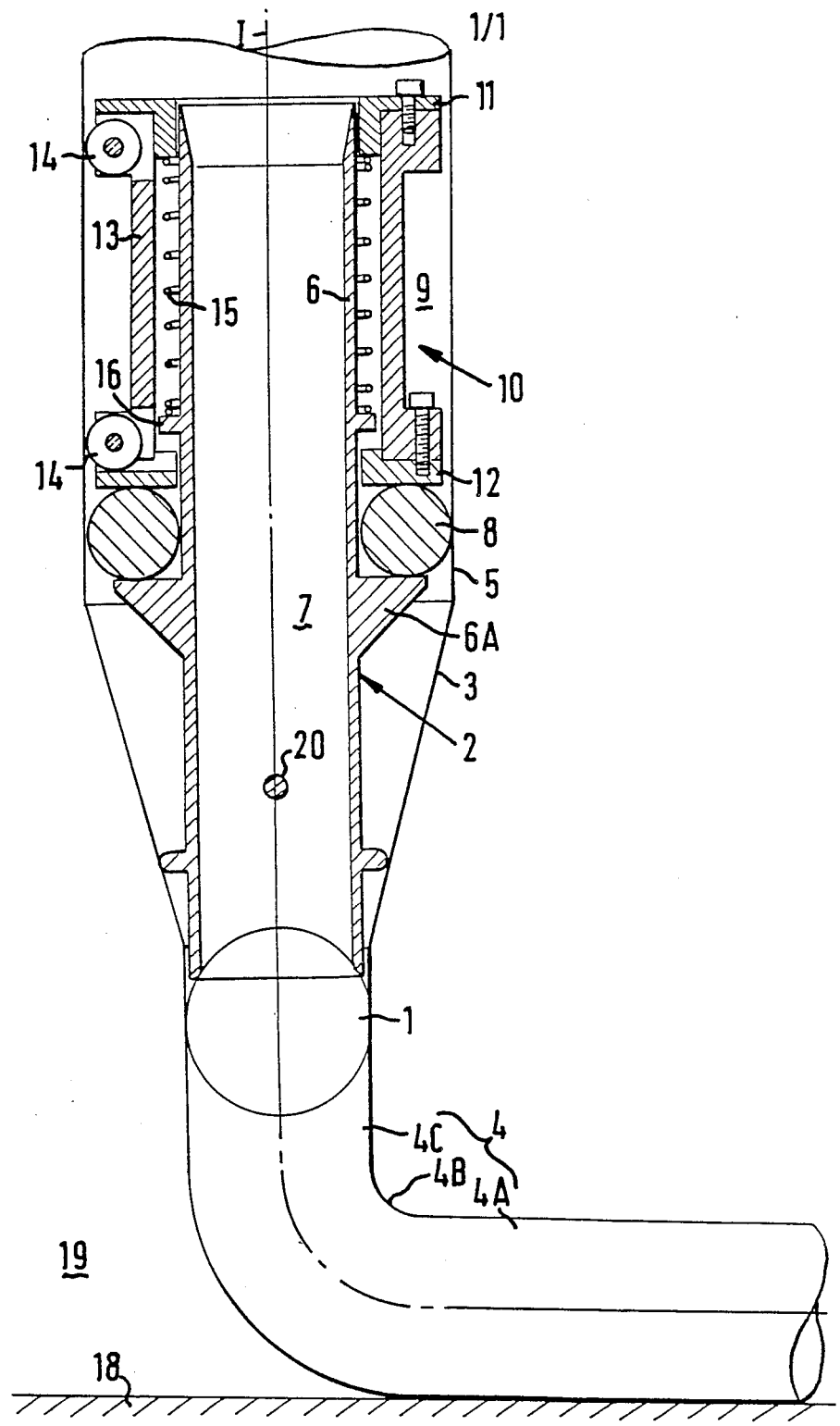

TFL ASSEMBLY FOR A DUAL DIAMETER FLOW-LINE/RISER SYSTEM AND FLOW-LINE/RISER SYSTEM FOR USE WITH THE ASSEMBLY.

BACKGROUND OF THE INVENTION

The invention relates to a Through Flow-Line (TFL) assembly for a dual diameter flow-line/riser system and to a flow-line/riser system for use with the assembly.

Processing equipment mounted at the deck of a standing or floating platform in offshore oil and gas production operations is often connected to one or more underwater wellheads located at a distance from the platform by a flow-line/riser system. Typically such systems comprise a seabed flow-line leading from the wellhead to the platform base and a riser pipe extending from the platform base to the platform deck. A problem which may occur with flow-line systems of this type is that an unstable flow regime, called severe slugging, might be established. It has been found that the slugging tendency can be diminished by providing the system with a riser pipe having a larger internal diameter than the seabed flow-line.

A problem encountered with a dual diameter flow-line system of this type is that it jeopardizes TFL operations which are normally carried out with a plug or sphere which is pumped through the flow-line system. Pipeline pigs are commonly used for sweeping, cleaning, or inspecting both offshore and onshore pipeline systems.

SUMMARY OF THE INVENTION

An object of the present invention is to provide a TFL assembly which can be used in a dual diameter flow-line/riser system.

It is a further object of the invention to provide a dual diameter flow-line/riser system for use with the TFL assembly.

In accordance with these and other objects of the invention, a TFL assembly is deployed comprising a pig fitting in the small diameter flow-line section and a pig catching tool fitting in the large diameter riser section. The pig catching tool comprises a central opening which is sealed off by the pig upon joining said pig and tool after entry of the pig from the small diameter flow-line section into the large diameter riser section.

The flow-line/riser system according to the invention comprises a small diameter flow-line section and a large diameter riser section, which sections are at one end thereof connected to each other. The large diameter riser section is provided with means for launching of the pig catching tool into the flow-liner/riser system, and said small diameter flow-line section is provided with means for launching the pig into the flow-line/riser system.

Said small diameter flow-line section may consist of an underwater pipeline, which extends along the bottom of a body of water from an underwater wellhead toward a riser foot. The small diameter flow-line section may further include a curved part at said one end thereof forming said riser foot. The large diameter riser section may be formed by a riser pipe extending between the riser foot and the deck of a platform structure located above the riser foot.

A BRIEF DESCRIPTION OF THE DRAWINGS

The invention will now be described in more detail, by way of example, with reference to the accompanying drawing, in which:

The FIGURE shows a sectional view of a TFL assembly according to the invention in a dual diameter flow-line/riser system.

A DETAILED DESCRIPTION OF THE PREFERRED EMBODIMENT

The TFL assembly shown in the FIGURE comprises a spherical pig 1 and a pig catching tool 2. The assembly is located at the conical transition section 3 of a dual diameter flow-line/riser system, which section 3 connects a small diameter flow-line section 4 to a large diameter riser section 5 of the system.

The pig catching tool 2 comprises a tubular member 6 having a central opening 7 and a flexible torus 8 arranged around the tubular member 6 for providing a seal in the annular space 9 formed between the tubular member and the wall of the large diameter flow-line section 5. The torus 8 rests on a shoulder 6A formed on the outer surface of the tubular member 6. The pig catching tool further comprises a guide body 10 arranged in the annular space 9 above the torus 8. The guide body comprises an upper and a lower terminal ring 11 and 12, respectively, which rings are connected by bolts to a cylindrical central part 13 of the body 10. The guide body 10 is further provided with guide wheels 14 which run on the internal surface of the wall of the large diameter flow-line section 5. The guide body 10 is slidably arranged around the tubular member 6 and a compression spring 15 is arranged between a collar 16 mounted on the tubular member 6 and the upper terminal ring 11 of the guide body 10, thereby pushing the guide body 10 away from the torus 8 in a direction parallel to a central axis I of the tubular member 6. In the central bore of the tubular member 6, a rod 20 has been installed to prevent the pig 1 from escaping through the pig catching tool 2.

The flow-line/riser system shown in the drawing comprises a small diameter flow-line section 4 including a horizontal part 4A which runs along the bottom 18 of a body of water 19 from an underwater wellhead (not shown) towards a riser foot. The small diameter flow-line section 4 further comprises a curved part 4B and a short vertical part 4C, which parts 4B and 4C form said riser foot. The large diameter riser section 5 is formed by a large diameter riser pipe which is connected to the short vertical part 4C of the small diameter flow-line section 4 by means of the conical transition section 3. The large diameter riser pipe 5 is connected at the top thereof to processing equipment mounted at the deck of a platform structure (not shown).

The TFL assembly according to the invention may be used as a cleaning device for a dual diameter flow-line/riser system. If cleaning is required the pig catching tool 2 is launched into the large diameter riser section 5 via a sluice at the riser top. As the fluid flowing through the flow-line/riser system can freely pass through the central opening 7 of the pig catching tool 2, the tool 2 will lower itself through the large diameter riser section 5 to the riser foot by its own weight, even during continued fluid production via the flow-line/riser system. The tubular member 6 is suspended from the guide body 10 during the descent of the pig catching tool 2 and the lower terminal ring 12 is pushed away by the spring 15 from the shoulder 6A, thereby eliminating any axial compression force to the flexible torus 8. This reduces friction between the torus and the wall of the large diameter riser pipe 5 ensuring a gradual descent of the tool 2 through the riser pipe 5.

The pig catching tool 2 will be stopped at the conical transition section 3 in the position shown in the drawing. Then the spherical cleaning pig 1 is launched at the wellhead assembly in the usual way at the upstream end of the small diameter flow-line/riser section 4 via a sluice (not shown). The cleaning pig 1 fits closely inside the small diameter flow-line section 4 and is pushed through the interior of the flow-line section by the fluid produced from the wellhead. While the cleaning pig 4 is pushed through the small diameter flow-line section 4, a slug of solid debris and liquid contaminates is collected in front of the pig 1. When the slug reaches the pig catching tool 2, it will pass through the tool 2 via the central opening 7. However, the width of central opening 7 is slightly smaller than the diameter of the spherical pig 1 and the pig 1 will catch at the entrance of said opening 7, thereby sealing off said opening 7. Next, the driving pressure of the produced fluid behind the pig 1 will push both the pig 1 and the pig catching tool 2 in upward direction through the large diameter riser diameter section 5, thereby cleaning the inner wall thereof. The weight of the guide body 10 rests on the spring 15 during the upward movement of the pig and tool through the riser pipe and the spring will be compressed, squeezing the flexible torus between the lower terminal ring 12 of the guide body 10 and the shoulder 6A on the tubular member 6. This deforms the torus 8 such that it firmly seals the annular space 9 around the tubular member 6 from fluid leakage therethrough. After the pig 1 and pig catching tool 2 have reached the riser top they are, together with the slug in front thereof, removed from the interior of the flow-line riser system via the sluice at the riser top through which the pig catching tool 2 was launched.

It will be understood that the TFL assembly according to the invention may be used for TFL operations in any dual diameter flow-line/riser system. However, where the large diameter flow-line section thereof does not extend in a substantially vertical direction, then the pig catching tool is provided with a recoil valve mounted in the central opening thereof or some other means for enabling the tool to be pumped toward the location where the large and small diameter flow-line sections are interconnected. Alternatively, the pig catching tool may be launched at said location into the flow-line system.

It will further be understood that the TFL assembly according to the invention may be used for any TFL operation, both in offshore and onshore flow-line/riser systems. If the assembly is used for pipe inspection operations then the pig may be a so-called "intelligent pig" and the pig catching tool may be provided with riser inspection instrumentation. Alternatively the pig catching tool may have no instrumentation and inspection of the large diameter riser pipe may be carried out by a separate large diameter intelligent pig which is pumped down and up through the riser pipe.

Many other modifications may be made in the apparatus and technique hereinbefore described without departing from the scope of the appended claims. Accordingly, it should be clearly understood that the embodiment of the invention shown in the accompanying drawing is illustrative only.

What is claimed is:

1. A TFL assembly for use with a dual diameter flow-line/riser system having a small diameter flow-line section and a large diameter riser section, the assembly comprising:
   a pig fitting in the small diameter flow-line section; and
   a pig catching tool fitting in the large diameter riser section, said pig catching tool comprising:
      a tubular member having a central bore defining a central opening which is disposed to be sealed off by the pig upon joining said pig and pig catching tool after entry of the pig from the small diameter flow-line section into the large diameter riser section;
      a flexible torus arranged around said tubular member for providing a seal in an annular space formed between the tubular member and an inner wall of the large diameter riser section; and
      a guide body arranged around and connected to said tubular member, said guide body comprising means for selectively deforming the flexible torus into a sealing relationship between the tubular member and the large diameter riser.

2. A TFL in accordance with claim 1, wherein said pig has a spherical shape.

3. A TFL in accordance with claim 1, wherein said central bore of the tubular member has a diameter which is slightly smaller than the internal diameter of said small diameter flow-line section.

4. A TFL assembly in accordance with claim 1 wherein said guide body further comprises:
   a ring-shaped extremity;
   a shoulder formed on the outer side of said tubular member; and
   said flexible torus being located between said ring-shaped extremity and said shoulder.

5. A TFL assembly in accordance with claim 4, wherein said guide body is connected to said tubular member by a spring which pushes the ring-shaped extremity of the guide body away from said shoulder in a direction parallel to a central axis of the tubular member.

6. A TFL assembly in accordance with claim 1, further comprising guide wheels connected to the guide body and disposed to run in use along the inner wall of the large diameter riser section.

7. A dual diameter flow-line/riser system for use with a TFL assembly, the system comprising:
   a small diameter flow-line section having means for launching the pig into the flow-line/riser system; and
   a large diameter riser section, connected at one end to an end of the small diameter flowline section, said large diameter riser section having means for launching a pig catching tool into the flow-line/riser system.

8. A dual diameter flow-line/riser system for deployment between an underwater wellhead at the bottom of a body of water and a deck of a platform structure and which is compatible with a TFL assembly, said flowline/riser system comprising:
   a small diameter flow-line section extending along the bottom of the body of water;
   said small diameter flow-line section comprising:
      means for launching a pig into the flow-line/riser system; and a riser foot formed by a curved portion of the small diameter flow-line section; and a large diameter riser section, connected at one end to the small diameter flow-line at the riser foot and leading to the deck of the platform, said large diameter riser section further comprising means for launching a pig catching tool into the flow-liner/riser system.

9. A TFL assembly for use with a dual diameter flow-line/riser section having a small diameter flow-line section and a large diameter riser section, the assembly comprising:

a pig fitting in the small diameter flow-line section; and a pig catching tool fitting in the large diameter riser section, said pig catching tool comprising:

a tubular member having a central bore forming a central opening which is disposed to be sealed off by the pig upon joining said pig and pig catching tool after entry of the pig from the small diameter flow-line section into the large diameter riser section;

a flexible torus arranged around said tubular member for providing a seal in an annular space formed between the tubular member and an inner wall of the large diameter riser section;

a guide body arranged around and connected to said tubular member, said guide body comprising:

a ring shaped extremity;

a shoulder formed on the outer side of said tubular member; and said flexible torus being located between said ring-shaped extremity and said shoulder; and a spring connecting the guide member to the tubular member, said spring pushing the ring-shaped extremity of the guide body away from the shoulder in a direction parallel to a central axis of the tubular member.

10. A TFL assembly in accordance with claim 9, further comprising guide wheels connected to the guide body and disposed to run in use along the inner wall of the large diameter riser section.

11. A TFL in accordance with claim 9, wherein said pig has a spherical shape.

12. A TFL in accordance with claim 9, wherein said central bore of the tubular member has a diameter which is slightly smaller than the internal diameter of said small diameter flow-line section.

* * * * *